US008110025B1

(12) United States Patent
Schwaiger

(10) Patent No.: US 8,110,025 B1
(45) Date of Patent: Feb. 7, 2012

(54) DUST COLLECTOR CHIP SEPARATION BAFFLE

(75) Inventor: Barry Martin Schwaiger, Murfreesboro, TN (US)

(73) Assignee: Walter Meier (Manufacturing) Inc., La Vergne, TN (US)

( * ) Notice: Subject to any disclaimer, the term of this patent is extended or adjusted under 35 U.S.C. 154(b) by 0 days.

(21) Appl. No.: 12/886,110

(22) Filed: Sep. 20, 2010

(51) Int. Cl.
*B01D 45/00* (2006.01)

(52) U.S. Cl. ............... 95/268; 55/361; 55/337; 55/424; 55/426; 55/428; 55/429; 55/374; 55/385.1; 55/385.2; 55/DIG. 18; 55/DIG. 26

(58) Field of Classification Search .................. 55/361, 55/337, 424, 426, 428, 429, 374, 385.1, 385.2, 55/DIG. 18, DIG. 26
See application file for complete search history.

(56) References Cited

U.S. PATENT DOCUMENTS

| | | | | |
|---|---|---|---|---|
| 2,068,459 | A * | 1/1937 | Monaghan | 55/418 |
| 2,630,879 | A * | 3/1953 | Hage | 55/429 |
| 2,678,110 | A * | 5/1954 | Madsen | 55/398 |
| 5,129,125 | A * | 7/1992 | Gamou et al. | 15/352 |
| 5,163,985 | A * | 11/1992 | Chen | 55/356 |
| 6,179,889 | B1 * | 1/2001 | Liu | 55/368 |
| 6,221,135 | B1 * | 4/2001 | Wirth et al. | 95/273 |
| 6,312,594 | B1 | 11/2001 | Conrad et al. | |
| 6,484,350 | B2 | 11/2002 | Yung | |
| 6,507,974 | B1 * | 1/2003 | Cheng | 15/347 |
| 6,531,066 | B1 | 3/2003 | Saunders et al. | |
| 6,758,874 | B1 * | 7/2004 | Hunter, Jr. | 55/337 |
| 6,797,046 | B2 * | 9/2004 | Wang | 96/421 |
| 6,810,558 | B2 * | 11/2004 | Lee | 15/353 |
| 6,833,016 | B2 * | 12/2004 | Witter | 55/337 |
| 7,260,868 | B2 * | 8/2007 | Cheng | 15/347 |
| 7,550,021 | B2 * | 6/2009 | Witter | 55/295 |
| 7,744,667 | B2 | 6/2010 | Oh et al. | |
| 7,780,753 | B2 | 8/2010 | Lang | |
| 7,824,457 | B2 * | 11/2010 | Witter | 55/337 |
| 2004/0187449 | A1 * | 9/2004 | Witter | 55/337 |
| 2005/0172586 | A1 | 8/2005 | Oh et al. | |
| 2008/0016831 | A1 * | 1/2008 | Cheng et al. | 55/337 |
| 2008/0104795 | A1 | 5/2008 | Lang | |
| 2010/0132318 | A1 | 6/2010 | Igawa | |
| 2010/0218467 | A1 * | 9/2010 | Witter | 55/337 |

OTHER PUBLICATIONS

Steve Scott, Dust Collection Demystified—Tips for choosing and configuring system to fit your needs, Fine Woodworking, Tools & Shops 2007, 52-57 pp.

* cited by examiner

*Primary Examiner* — Jason M Greene
*Assistant Examiner* — Dung H Bui
(74) *Attorney, Agent, or Firm* — Schiff Hardin LLP

(57) ABSTRACT

A dust collector for collecting sawdust and wood chips during use of wood working tools includes a conduit or hose connected through an impeller forcing air with entrained dust and chips to an inlet ring of a single stage dust collector. A particle collector reservoir is connected on the bottom of the inlet ring and a filter element is connected on top of the inlet ring. A tapered ring wall with a central opening is provided in the inlet ring and a baffle is mounted in the central opening of the ring wall. The baffle is of a cone shape and tapers an opposite direction from the frusto-conical ring wall. The inlet opening of the inlet ring is directed to between the ring wall and the baffle.

6 Claims, 5 Drawing Sheets

DUST COLLECTOR CHIP SEPARATION BAFFLE

BACKGROUND OF THE INVENTION

1. Field of the Invention

The present invention relates generally to a dust collector, and more particularly to a baffle for a chip separator of a dust collector for a wood chip and dust collector.

2. Description of the Related Art

Wood working using power tools, such as table saws, planers and other work cutting, forming and shaping tools generates a substantial quantity of dust and wood chips. Various measures have been used to collect the wood dust and chips, particularly in wood working shops that include multiple wood working, cutting and forming machines. One such dust collecting apparatus is referred to as a single stage dust collector 10, an example of which is shown in FIG. 1. The so-called single stage dust collector is distinguished from two stage dust collectors that include a first cyclonic dust separator, the output of which is carried to a second air filter cartridge. In the single stage collector as shown, an inlet hose 12 is connected to a table saw, sander, planer and joiner or other wood working, shaping or forming device. Several such wood working devices may be connected to a dust collecting apparatus through a network of hoses and/or ductwork, for example. The inlet hose 12 is connected to an impeller 14 that is driven to draw air in which is entrained sawdust, wood chips and other dust and particles generated by the wood working tools through the inlet hose 12. Air with any entrained dust and chip is carried through the impeller 14 and along an outlet hose 16 to a filter cylinder 18.

The filter cylinder 18 is formed with a lower cylinder bag or reservoir 20 of air impervious material, an upper air permeable bag or filter element 22, and an inlet ring 24 connected between the upper and lower bags 22 and 20 and to which is connected the outlet hose 16. Dust and wood chips carried in the inlet hose 12, through the impeller 14 and the outlet hose 16 to the filter inlet ring 24. The air carrying the dust and wood chips enters the filter inlet ring 24 at an angle, generally tangentially to the cylinder wall, causing a circular air flow within the vertically oriented filter unit 18. Heavier particles, such as wood chips and wood dust, settle out into the bag 20 in the lower portion of the cylinder 18 while the air from which the dust and chips have been removed for the most part moves into the air permeable bag or filter element 22. The air passes through the air permeable bag or filter element 22 while any remaining wood dust or chips is retained in the filter element 22. The inlet ring 24 is supported by a support bar 26 on a base 28.

As the single stage dust collector is used, in-rushing air into the filter inlet ring 24 circulates the air and carries with it the dust and wood chips that are being carried into the dust collector. The continuing circulation of the dust and wood chips carries some of the in-flowing material upward into the filter bag or filter element 22 in the upper portion of the dust collector 10. This upwardly carried dust and chips loads or even blocks the filter element 22 and reduces the capacity of the dust collector, causing relatively frequent cleaning and emptying for proper operation. Even when the wood working devices are not actively producing wood chips and dust, any dust and wood chips already in the lower reservoir 20 of the dust collector are circulated when the impeller 14 is on, leading to the dust being carried up into the filter 22 and loading and blocking of the filter material. The filter material experiences heavy loading and becomes increasingly blocked even when additional wood chips and dust are not being drawn into the system.

SUMMARY OF THE INVENTION

The present invention of one embodiment provides a dust collector for a wood working device that baffles the air flow between the dust and chip collecting lower container and the air filter of a single stage dust collector. A decrease in the quantity of dust and chips being carried from the lower collecting container or reservoir to the upper air filter is provided, reducing loading and blockage of the air filter and requiring less frequent cleaning of the air filter element.

The baffle according to embodiments of the invention includes surfaces defining air flow paths that direct particles, chips and dust entering the dust collector into the dust collecting lower compartment and that provide an obstacle to movement of the particles from the lower compartment to the upper filter compartment. In one embodiment, a conical surface is provided. In a further improvement, two conical surfaces are provided, and in yet a further enhancement two oppositely directed conical surfaces are provided. The air inlet is directed to between the two oppositely directed conical surfaces.

DETAILED DESCRIPTION OF THE PREFERRED EMBODIMENTS

Figure 1:
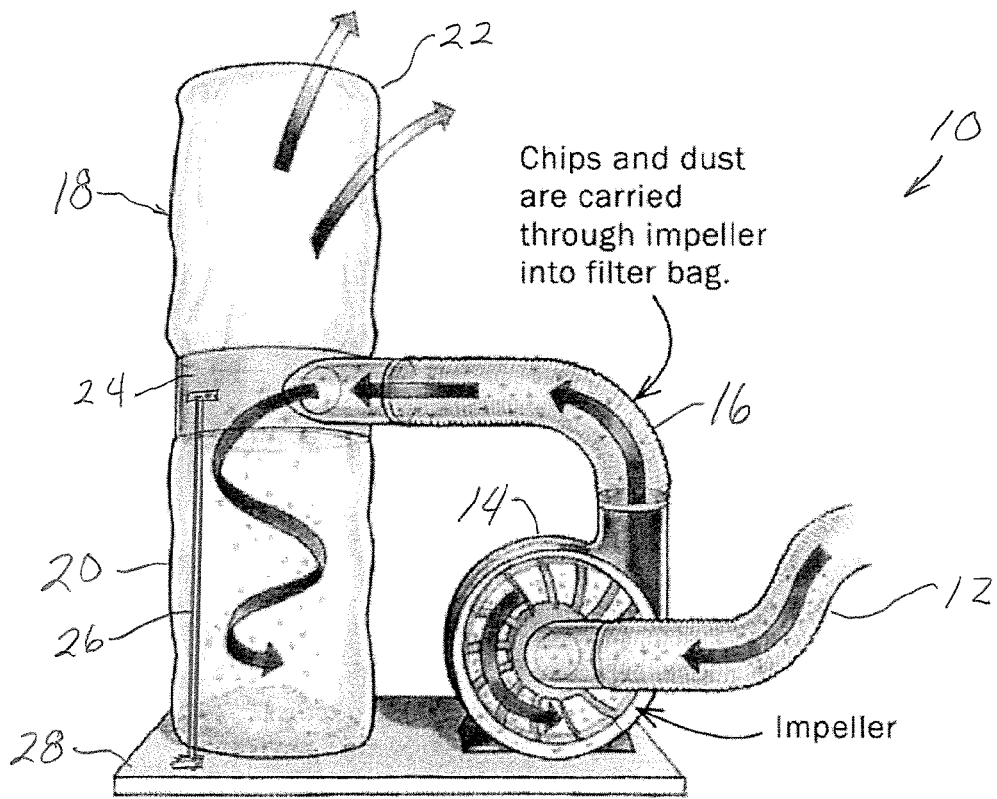
FIG. 1 is a side view of a single stage dust filter according to the prior art.
Figure 2:
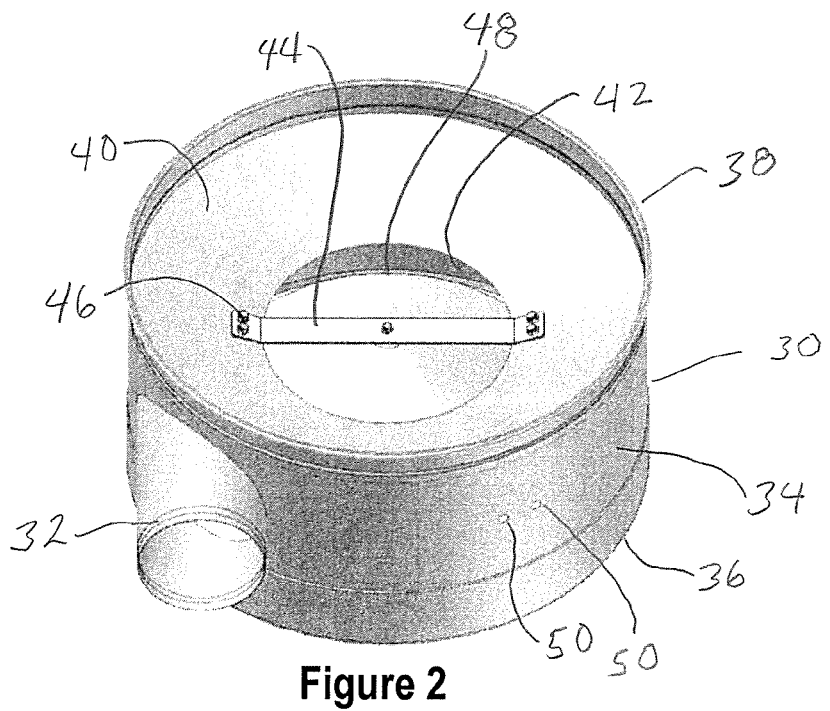
FIG. 2 is a top perspective view showing an inlet ring of a single stage dust filter according to the principles of the present invention.

An embodiment of the invention is shown in FIG. 2 including an inlet ring or dust separator 30 for a dust collector, such as the dust collector 10 of FIG. 1, although use in other dust collectors are possible. The inlet ring 30 includes a inlet opening 32 to which a tube, conduit or other air flow carrying member may be connected. The inlet opening 32 is tangentially disposed relative to a circular side wall 34 of the inlet ring 30. The inlet ring 30 has a bottom end 36 for connection to a particle reservoir and a top end 38 for connection to a filter membrane or filter element. The filter element of the dust collector may be a fabric bag, for example, having a 30 micron filter rating, or in a preferred embodiment, a 1 micron rated filter element. Other size and types of filters are of course possible.

Within the inlet ring 30 is a ring wall 40 that extends inwardly from the interior of the circular side wall 34 and defines a central opening 42. The reference to the inlet ring and the ring wall is not limited to structures that are strictly ring-shaped. These elements may include other shapes, configurations and arrangements, including but not limited to helical elements, elliptical elements, tapers and other shapes. In the illustrated embodiment, a support strap 44 is affixed to span the central opening 42, such as by screws, bolts or rivets 46, although the strap may be held in place by welds or other means as well. At the center of the strap 44 is connected a baffle element 48. Also visible in FIG. 2 are bores 50 in the inlet ring 30 at which are connected a support element (not shown) to support the inlet ring 30 in position above the reservoir.

Figure 3:
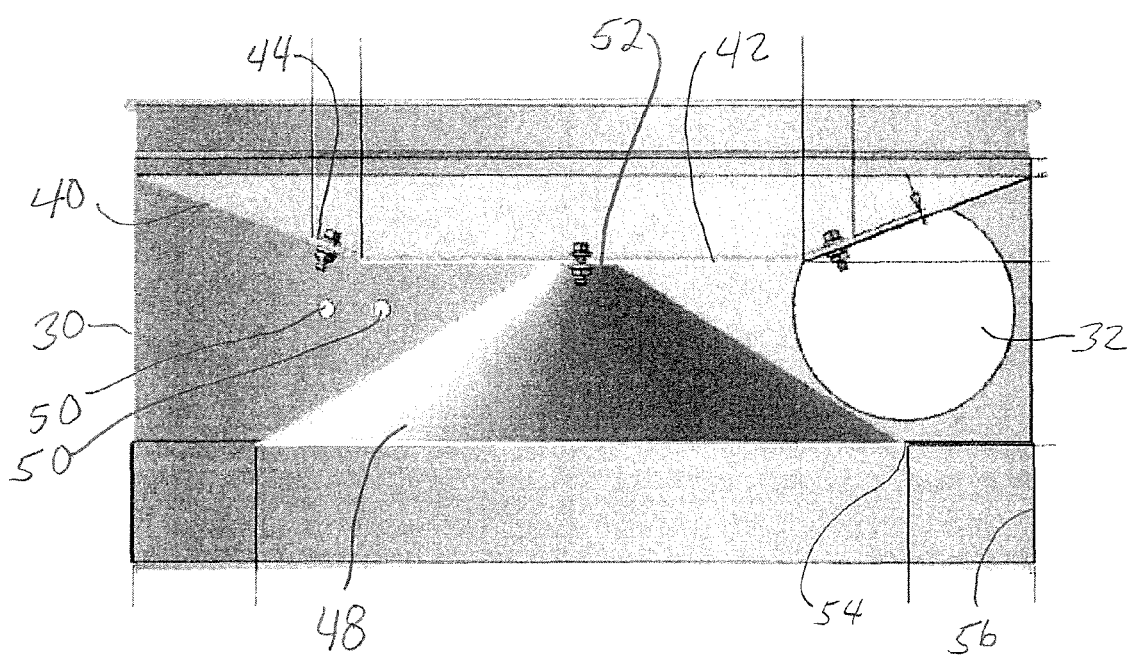
FIG. 3 is a side cross sectional view of an embodiment of the inlet ring and dust baffle.

FIG. 3 shows the inlet ring 30 in side cross section with the inlet opening 32 for receiving air with entrained particles and dust. The ring wall 40 is mounted to the interior of the inlet ring 30 above the inlet opening 32. The ring wall 40 is of a frusto-conical shape, tapering downward from the interior wall of the inlet ring 30 to the central opening 42. In an exemplary embodiment, the ring wall 40 extends at an angle of approximately 70 degrees from the wall of the inlet ring 30. In one embodiment, the central opening 42 has a diameter of approximately 50% of the diameter of the inlet ring 30, or slightly less. Other angles and other central opening sizes are of course also possible. The two bores 50 for the inlet ring support (not shown) are provided in the wall of the inlet ring 30. Several such bores or other means for securing the inlet ring to a support may be provided.

The mounting strap 44 supports the baffle 48 at the central opening 42 of the ring wall 30. The baffle 48 is of a conical shape, tapering in the opposite direction from the frusto-conical ring wall 40. In particular, the conical baffle 48 has a flat top 52 at its apex to provide a flat area for mounting of the mounting strap 44. The flat top 52 is small compared to the size of the baffle, approximately 10 to 15 percent in one example. From the flat top 52, the conical baffle 48 tapers outwardly and downwardly to a perimeter 54 spaced from the interior wall 56 of the inlet ring 30. In an exemplary embodiment, the baffle 48 tapers at approximately 32 degrees from horizontal, although of course other angles are possible. The baffle 48 extends below the inlet opening 32 so that air and entrained particles entering the inlet ring 30 flow between the ring wall 40 and the baffle 48. The outer edges 54 of the baffle 48 are spaced from the interior 56 of the inlet ring 30 to permit particles to fall from the air flow to the particle reservoir 20 in the lower portion of the dust collector 10, see FIG. 1 for example. Not only does the baffle 48 permit the particles to fall to the dust reservoir 20, but the baffle 48 blocks the upward travel of particles that have reached the reservoir 20 and which might otherwise move upward into the filter compartment 18 under the influence of the turbulent air flow within the dust collector.

Figure 4:
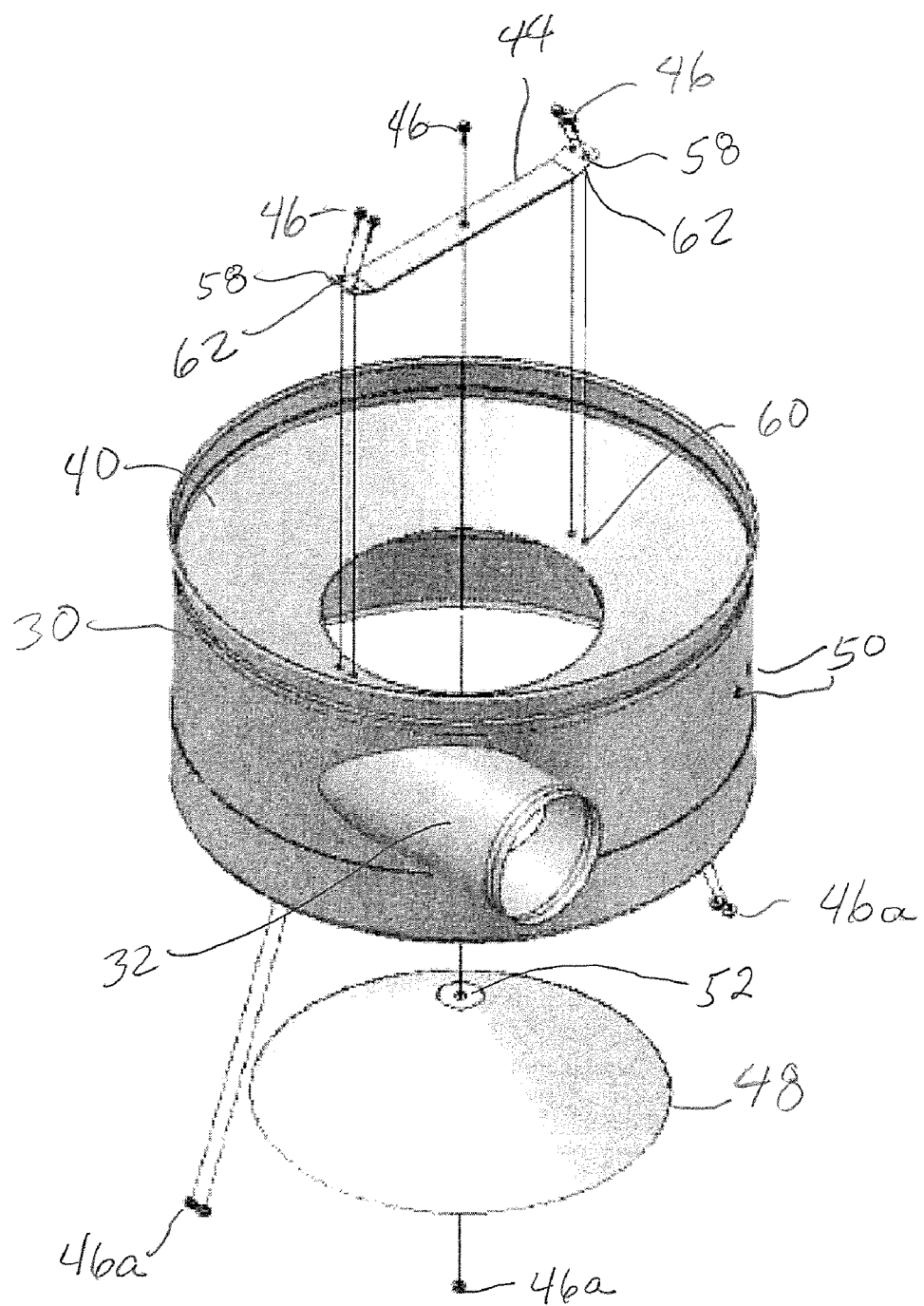
FIG. 4 is an exploded view of the inlet ring and dust baffle.

Turning now to FIG. 4, the inlet ring 30 has the baffle 48 and baffle support strap 44 removed. The baffle support strap 44 of the illustrated embodiment is secured to the ring wall 40 by two bolts 46 and nuts 46a on each end that pass through bores 58 in the strap ends and corresponding bores 60 in the ring wall 40. The ends 62 of the baffle support strap 44 are formed at an angle to match the angle of the ring wall 40. The baffle 48 is secured to the baffle support strap 44 by a bolt 46 and nut 46a in the center of the baffle 48 and in the center of the baffle support strap 44. The bores 50 for securing a support to the inlet ring 30 are shown.

It is foreseen that the baffle may be secured in the inlet ring by other fasteners and other supports. For example, the support strap 44 may be rotated relative to it's illustrated position to another position relative to the inlet opening 32. The support strap may extend to the walls of the inlet ring 30, or the baffle 48 may be otherwise secured to the inlet ring 30 without being mounted on the ring wall 40.

Figure 5:
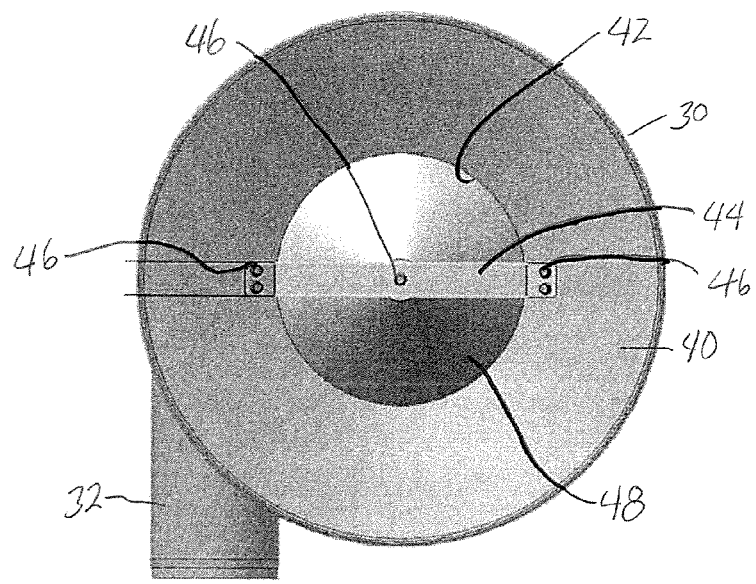
FIG. 5 is a top plan view of the inlet ring and dust baffle.

In FIG. 5, the view of the inlet ring 30 from the top shows the opening 42 in the ring wall 40 and the strap 44 securing the baffle 48 in place in a position concentric with the opening 42 in the ring wall 40. As can be seen, the diameter of the inlet opening 32 into the inlet ring 30 is less than the extent that the ring wall 40 extends into the interior of the inlet ring 30. In flowing air with entrained particles is directed by the inlet opening 32 entirely below the ring wall 40 upon initial entry into the inlet ring 30. The tangentially directed inlet opening 32 in conjunction with the circular walls of the inlet ring 30 directs the in-flowing air in a circular direction about the interior of the inlet ring 30. The circulating air drops air speed as it enters the inlet ring 30, thereby dropping particulates carried in the air, which collect in the reservoir.

The baffle support strap 44 is transverse to the in-flowing air, although other orientations of the support strap 44 may be provided, including providing the support strap generally in line with the inflowing air of the inlet 32, or at some other location or angle.

Figure 6:
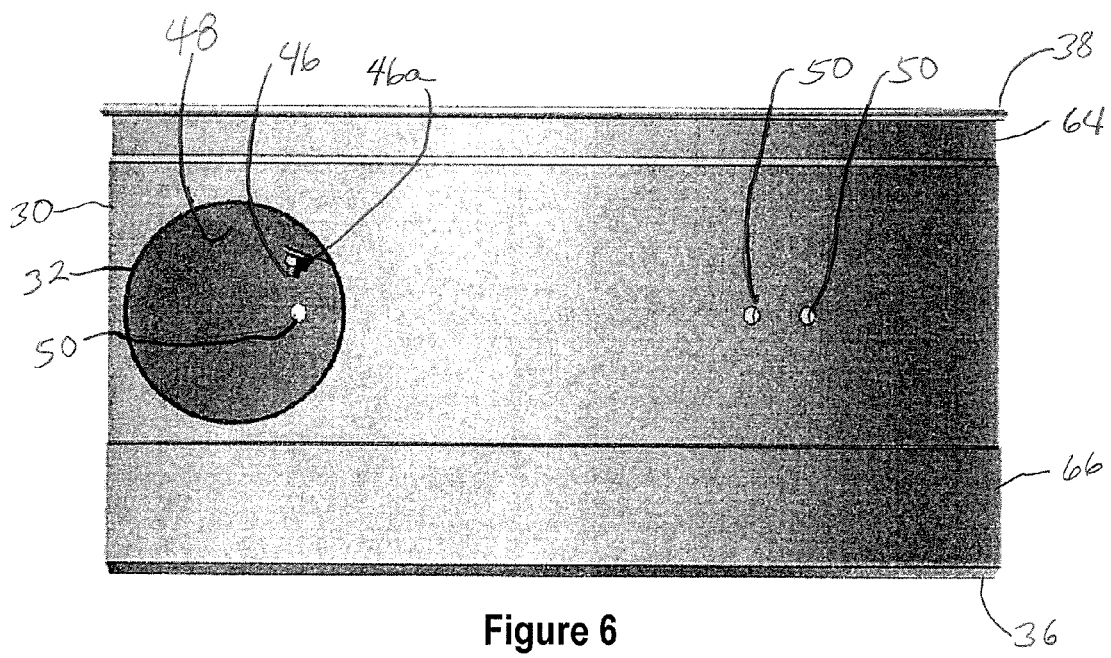
FIG. 6 is a side elevational view of the inlet ring looking into the inlet opening.

FIG. 6 shows that a pair of the bores 50 for supporting the inlet ring 30 are on one side of the inlet ring 30 while another pair of bores 50, one of which is visible through the inlet opening 32, is provided approximately opposite the first pair 50. Other arrangements of supports may be provided instead. The inlet opening 32 is directed toward the bolt and nut fasteners 46 and 46a holding the baffle strap 44 in place. As noted above, it is foreseen to locate the inlet opening and baffle support strap in different relative positions so that the in-flowing air does not directly strike the nut and bolt fasteners 46 and 46a. As can be seen, the walls of the inlet ring 30 are shaped at 64 to permit securing of the filter element 22 and at 66 to permit securing of the reservoir 20 to the inlet ring 30.

Figure 7:
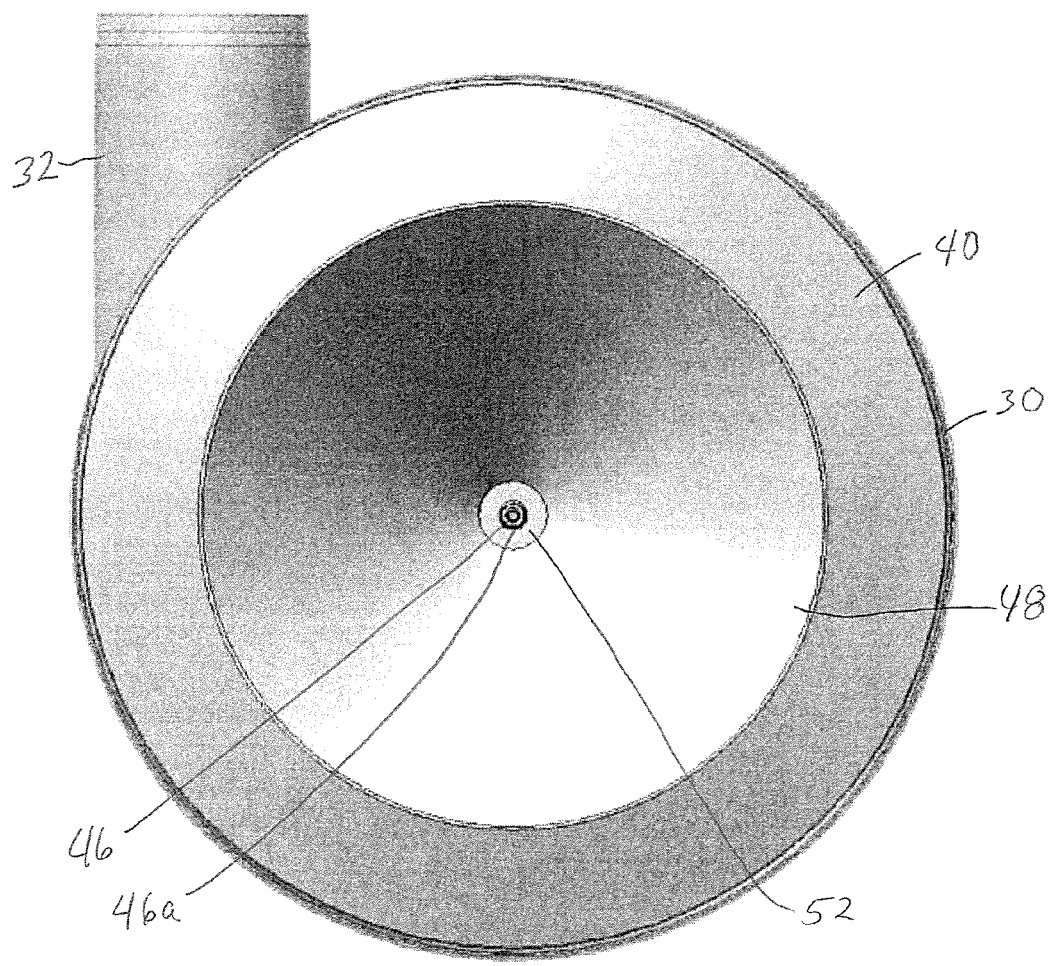
FIG. 7 is a bottom plan view of the inlet ring and dust baffle.

Referring to FIG. 7, the baffle 48 occupies a substantial portion of the area within the inlet ring 30 when viewed from below. In an exemplary embodiment, the diameter of the baffle 48 is about 85% of the interior diameter of the inlet ring 30. The baffle 48 is to be large enough to block up-flowing particles from the reservoir 20. The flattened top 52 of the baffle 48 can be seen, as well as the bolt 46 and nut 46a securing the baffle 48 to the baffle strap 44.

Testing has been performed using different sizes of baffle cones in the inlet ring. Test samples were 306 mm, 356 mm, and 406 mm in diameter mounted within a DC-1100A inlet ring. Test results showed increasing effectiveness of blocking of particulates from reaching the filter element in the upper portion of the dust collector for larger baffles. On the other hand, larger baffles permitted little room between the baffle edge and the interior wall of the inlet ring for installing the reservoir container to the inlet ring.

The single stage dust collector may be a small portable unit driven by a small motor for use, for example, in a small wood working shop on one or a few tools, or may be a larger unit semi-permanently connected through hoses and duct work to a number of tools in a larger shop. The single stage dust collectors are particularly well adapted to a home wood worker who has a garage or basement shop with a tablesaw, joiner, planer and bandsaw and the need for a dust collecting system connected to each. The dust collector is portable and can be moved from tool to tool or connected through a system of ducts and hoses to the dust collector in a more permanent and convenient solution.

Although other modifications and changes may be suggested by those skilled in the art, it is the intention of the inventors to embody within the patent warranted hereon all changes and modifications as reasonably and properly come within the scope of their contribution to the art.

I claim:

1. A dust collector for collecting particles, dust and chips in a wood working shop, comprising:
    an inlet conduit directing air containing at least one of particles, dust and chips;

an inlet ring having a top, a bottom and an inlet opening to which the inlet conduit is connected;

a collection container connected to said bottom of said inlet ring;

a filter element connected to said top of said inlet ring;

a ring wall in said inlet ring, said ring wall being affixed to said inlet ring and defining a central opening; and a baffle mounted in said inlet ring and spaced from said ring wall, said inlet conduit directing air flow between said ring wall and said baffle wherein said ring wall and said baffle taper toward one another, said ring wall extending from an interior surface of said inlet ring to said central opening in a frustrum shape, said baffle being conical in shape and mounted spaced from said ring wall and spaced from said inlet ring.

2. A dust collector as claimed in claim 1, further comprising:

a mounting element affixed between said baffle an at least one of said ring wall and said inlet ring to support said baffle in a position suspended within said inlet ring and free of contact with said inlet ring and said ring wall.

3. A method for separating dust from air, comprising the steps of:

carrying particulates in an air stream into an inlet ring of a dust collector;

directing the air stream to between a ring wall and a baffle in the inlet ring wherein said ring wall is frusto-conical in shape and said baffle is substantially conical in shape and wherein said ring wall and said baffle taper toward one another to form a tapered space into which the air stream is directed;

circulating air of the air stream in the inlet ring so that particulates fall into a reservoir below the inlet ring and so that air with fewer particulates passes into an air filter above the inlet ring; and blocking particulates in the reservoir from moving from the reservoir to the air filter with the baffle.

4. A method as claimed in claim 3, wherein said blocking step includes directing the air stream along a circular flow path along an interior wall of the inlet ring, said baffle being spaced from the interior wall of the inlet ring and blocking air flow from the reservoir to the filter at a center of the inlet ring.

5. A dust collector for use with a power tool, comprising:

an air conduit connected to receive dust and particulates from the power tool;

an impeller connected in communication with said air conduit to move air in an air stream with entrained dust and particulates along said air conduit;

an inlet of a dust separator connected to said air conduit to receive the air stream, said inlet directing the air stream in a generally circular path within the dust separator;

a dust reservoir connected to said dust separator and disposed below said dust separator;

an air filter connected to said dust separator and disposed above said dust separator; a ring wall of a frusto-conical shape mounted within the dust separator, and a baffle mounted in said dust separator below in-flowing air of the air stream, said baffle including a conical baffle surface disposed generally concentric with the circular path of the inflowing air, said conical surface defining a sloping baffle surface at a slope angle to direct particulates into said dust reservoir and permit air with reduced quantities of particulates to move to said air filter said ring wall and said baffle tapering toward one another.

6. A dust collector as claimed in claim 5, further comprising: a baffle mount connected to an apex of said conical baffle surface.

\* \* \* \* \*